(12) United States Patent
Schneider et al.

(10) Patent No.: US 12,358,342 B2
(45) Date of Patent: Jul. 15, 2025

(54) ELECTROMAGNETIC PROPORTIONAL VALVE AND SYSTEM HAVING A PROPORTIONAL VALVE

(71) Applicant: ECO Holding 1 GmbH, Marktheidenfeld (DE)

(72) Inventors: Toni Schneider, Esslingen (DE); Daniel Reimann, Baltmannsweiler (DE); Jens Möhring, Nürtingen (DE)

(73) Assignee: ECO Holding 1 GmbH (DE)

( * ) Notice: Subject to any disclaimer, the term of this patent is extended or adjusted under 35 U.S.C. 154(b) by 839 days.

(21) Appl. No.: 17/414,794

(22) PCT Filed: Dec. 17, 2019

(86) PCT No.: PCT/EP2019/085661
§ 371 (c)(1),
(2) Date: Jun. 16, 2021

(87) PCT Pub. No.: WO2020/127274
PCT Pub. Date: Jun. 25, 2020

(65) Prior Publication Data
US 2022/0082310 A1 Mar. 17, 2022

(30) Foreign Application Priority Data
Dec. 17, 2018 (DE) .................... 10 2018 132 448.0

(51) Int. Cl.
*B60H 1/00* (2006.01)
*B60H 1/32* (2006.01)
(Continued)

(52) U.S. Cl.
CPC ......... *B60H 1/00485* (2013.01); *F25B 41/34* (2021.01); *F25B 41/345* (2021.01);
(Continued)

(58) Field of Classification Search
CPC ........ B60H 1/00485; B60H 2001/3286; F25B 41/34; F25B 41/345; F25B 2341/067;
(Continued)

(56) References Cited

U.S. PATENT DOCUMENTS 5,476,313 A * 12/1995 Lauer .................... B60T 8/4809
303/119.2
5,639,061 A * 6/1997 Krauter ................. B60T 8/4872
303/116.2
(Continued)

FOREIGN PATENT DOCUMENTS

DE 195 30 899 A1 2/1997
DE 10 2014 119 592 A1 8/2015
(Continued)

OTHER PUBLICATIONS

Chinese Office Action and Search Report for Chinese Application No. 201980083759.1, dated May 24, 2022.

*Primary Examiner* — Len Tran
*Assistant Examiner* — Gustavo A Hincapie Serna
(74) *Attorney, Agent, or Firm* — Lerner David LLP

(57) ABSTRACT

The invention relates to an electromagnetic proportional valve, preferably for refrigerant, which has the following: an armature of an electromagnet which is arranged so as to be able to be moved axially between an idle position, an activation position and working positions and on which an activation element is arranged; a piston which is constructed as a hollow piston and which has at a first axial end region a first opening toward a supply of the expansion valve and at a second axial end region a second opening toward a pressure compensation space; and a blocking member which is constructed to close the second opening, wherein the piston is arranged so as to be able to be axially displaced and wherein the piston is constructed to block a fluid passage as a blocking element of a main valve device, wherein the fluid (Continued)

passage of the main valve device is blocked in the idle position of the armature, wherein the activation element is constructed to act in the activation position of the armature on the blocking member in such a manner that it releases the second opening at least in regions, and wherein the fluid passage of the main valve device is open in the working positions of the armature. The invention further relates to a system having such a proportional valve.

16 Claims, 4 Drawing Sheets

(51) Int. Cl.
*F25B 41/34* (2021.01)
*F25B 41/345* (2021.01)
*H01M 10/613* (2014.01)
*H01M 10/625* (2014.01)
*H01M 10/6569* (2014.01)

(52) U.S. Cl.
CPC ....... *H01M 10/613* (2015.04); *H01M 10/625* (2015.04); *H01M 10/6569* (2015.04); *B60H 2001/3286* (2013.01); *F25B 2341/067* (2013.01); *H01M 2220/20* (2013.01)

(58) Field of Classification Search
CPC ............. H01M 10/613; H01M 10/625; H01M 10/6569; H01M 2220/20; Y02B 30/70; Y02E 60/10
See application file for complete search history.

(56) References Cited

U.S. PATENT DOCUMENTS

| | | | |
|---|---|---|---|
| 5,669,675 A * | 9/1997 | Mueller | B60T 15/028 303/119.2 |
| 5,810,330 A | 9/1998 | Eith et al. | |
| 5,879,060 A * | 3/1999 | Megerle | B60T 8/5025 303/119.2 |
| 5,971,356 A * | 10/1999 | Offenwanger | F16K 1/00 251/282 |
| 6,021,997 A * | 2/2000 | Hell | F15B 13/0403 251/30.03 |
| 6,250,725 B1 * | 6/2001 | Schnalzger | F15B 13/044 303/119.2 |
| 6,254,200 B1 * | 7/2001 | Ganzel | F16K 31/408 303/119.2 |
| 6,435,210 B1 * | 8/2002 | Obersteiner | B60T 8/363 303/119.3 |
| 6,708,946 B1 | 3/2004 | Edwards et al. | |
| 7,198,249 B2 * | 4/2007 | Nakayasu | B60T 8/363 251/38 |
| 7,740,224 B2 * | 6/2010 | Bill | F15B 13/01 251/129.2 |
| 9,038,984 B2 * | 5/2015 | Voss | B60T 8/363 303/119.2 |
| 9,423,045 B2 * | 8/2016 | Mills | F16K 27/048 |
| 11,215,292 B2 * | 1/2022 | Bähr | F16K 3/24 |
| 11,906,217 B2 * | 2/2024 | He | F25B 41/35 |
| 2007/0210270 A1 * | 9/2007 | Stephenson | F16K 31/0689 251/38 |
| 2009/0212244 A1 * | 8/2009 | Pfaff | F16K 31/0648 251/30.03 |
| 2009/0293519 A1 * | 12/2009 | Hayashi | F25B 41/38 236/92 B |
| 2010/0213758 A1 * | 8/2010 | Nanahara | B60T 8/363 303/20 |
| 2012/0037829 A1 * | 2/2012 | Bill | F15B 13/0442 251/324 |
| 2012/0285568 A1 * | 11/2012 | Schulz | F15B 13/0435 251/30.01 |
| 2015/0096630 A1 * | 4/2015 | Ogawa | F16K 31/406 137/487.5 |
| 2015/0114495 A1 * | 4/2015 | Zhan | F16K 15/18 137/596.12 |
| 2016/0131403 A1 * | 5/2016 | Andoh | F25B 41/34 137/544 |
| 2016/0290525 A1 * | 10/2016 | Hotta | B60H 1/00921 |
| 2017/0159832 A1 * | 6/2017 | Hilzendegen | F16K 31/0675 |
| 2017/0307267 A1 * | 10/2017 | Landenberger | F16K 31/0668 |
| 2018/0187793 A1 * | 7/2018 | Futakuchi | F16K 27/041 |

FOREIGN PATENT DOCUMENTS

| | | | | |
|---|---|---|---|---|
| EP | 0 763 683 A1 | | 3/1997 | |
| EP | 3106726 A1 | * | 12/2016 | ............... F16K 1/12 |
| GB | 2455477 A | * | 6/2009 | ........... F01D 17/165 |
| WO | WO-2007101733 A1 | * | 9/2007 | ............. B60T 8/363 |
| WO | WO 2009/031007 A2 | | 3/2009 | |
| WO | WO-2012077439 A1 | * | 6/2012 | ........ B60H 1/00485 |
| WO | WO 2015/082194 A1 | | 6/2015 | |

* cited by examiner

ELECTROMAGNETIC PROPORTIONAL VALVE AND SYSTEM HAVING A PROPORTIONAL VALVE

The invention relates to an electromagnetic proportional valve. The invention further relates to a system having an electromagnetic proportional valve.

Valves are generally used to block and/or control the throughflow of a fluid. Simpler valves can be controlled only discretely. This means that they can only be switched on/off, that is to say, can only be opened and closed. However, a simple opening and closure of the valve is no longer sufficient for many applications. For example, the use as an expansion valve, which is used in battery cooling, air-conditioning or heat pump systems in order to produce there a defined and controllable pressure drop between the condenser (heat discharge) and evaporator (cooling) often requires continuous switching. On the whole, therefore, a continuous switching is often required. Such a continuous or consistent switching may be carried out, for example, by means of proportional valves which permit a continuous transition of the switching positions. Consequently, the volume flow of the fluid can be adjusted. Therefore, such proportional valves using a proportional magnet not only permit discrete switching positions, but also enable a consistent transition of the valve opening.

However, the construction of the known proportional valves is very complex so that they cannot be produced in a simple and cost-effective manner. The increased complexity further also often leads to individual functions of the proportional valve being disrupted.

An object of the invention is therefore to provide a proportional valve which overcomes the above-mentioned problems and disadvantages of the prior art. In particular, an object of the present invention is to provide a proportional valve which has a particularly low level of complexity and which at the same time is capable of performing its function in an optimum manner.

An object of the present invention is further to provide a system with a proportional valve in which the advantages of the proportional valve can be implemented.

The solution according to the invention involves providing an electromagnetic proportional valve, preferably for refrigerant, which has the following: an armature of an electromagnet which is arranged so as to be able to be moved axially between an idle position, an activation position and working positions and on which an activation element is arranged; a piston which is constructed as a hollow piston and which has at a first axial end region a first opening toward a supply of the expansion valve and at a second axial end region a second opening toward a pressure compensation space; and a blocking member which is constructed to close the second opening, wherein the piston is arranged so as to be able to be axially displaced and wherein the piston is constructed to block a fluid passage as a blocking element of a main valve device, wherein the fluid passage of the main valve device is blocked in the idle position of the armature, wherein the activation element is constructed to act in the activation position of the armature on the blocking member in such a manner that it releases the second opening at least in regions, and wherein the fluid passage of the main valve device is open in the working positions of the armature.

An electromagnetic proportional valve is in particular an expansion valve which can be controlled in a proportional manner. At many locations of the description, the term proportional valve and expansion valve is therefore used equally. The proportional valve is a continuous valve which can not only be switched (on/off) discretely, but also permits a continuous transition of the main valve opening (the opening which can be blocked by means of the piston). Consequently, the volume flow of the fluid can be adjusted. The electromagnetic proportional valve can be controlled by means of the electromagnet.

The idle position of the armature is also the position in which the armature is located in a powerless state of a coil of the electromagnet. In this instance, the main valve device and also a pressure compensation valve device which is formed by means of the blocking member are closed. In this state, high pressure is applied in the supply and low pressure is applied in the pressure compensation space. The high pressure presses the piston as a blocking element of the main valve device into a valve seat. It is only possible to open the main valve device after a pressure compensation.

This pressure compensation is carried out as follows: if the current (in the coil) increases, the armature moves into the activation position. The activation element also thereby moves into the activation position in which the activation element acts in such a manner on the blocking member that it releases the second opening at least in regions. When the opening is released in such a manner, a fluid (for example, a refrigerant) can flow through a through-hole in the piston. In particular, the fluid flows from the supply through the through-hole into the pressure compensation space. The pressure between the supply and the pressure compensation space is therefore compensated. The pressure compensation valve device is thus open. The main valve device is still closed.

If the current increases further, the armature moves into the working positions. In the working positions, the main valve device is opened in such a manner that the fluid can flow through them. The proportional valve is constructed as a piston valve. That is to say, the piston which can be displaced is the blocking member of the main valve device. The working positions are a working region in which the piston can be moved and fluid can flow through the main valve device. Preferably, in this region a continuous transition of the main valve opening is possible so that the volume flow of the fluid can be controlled (in a proportional manner) by means of the electromagnet. Even when the entire working region can preferably be continuously controlled, it is alternatively also sufficient when a continuous control is enabled only in a region thereof.

Preferably, both the valve seat of the main valve device and the valve seat of the pressure compensation valve device are constructed as a metal valve seat.

Using the proportional valve according to the invention, the object is achieved in a satisfactory manner. In particular, there is provided a proportional valve which has a particularly low level of complexity and which at the same time is capable of performing its function in an optimum manner.

According to an advantageous development of the invention, the movement of the armature in the working positions is transmitted directly to the piston.

In the working positions, a precise control of the piston is therefore possible. The main valve opening can therefore be influenced in a precise manner so that the volume flow of the fluid can be adjusted precisely. In particular, as a result of the direct dependence between the activation current (current in the coil) and the position of the piston, the throughflow of the proportional valve can be controlled in a precise manner by means of the activation current.

According to an advantageous development, an attachment is arranged at the second axial end region.

The attachment closes the second opening of the second axial end region in such a manner that the blocking member cannot be pressed out of the second opening. However, the attachment further has an axial hole by means of which the blocking member can be activated by means of the activation element. The activation element has to this end a projection. The projection extends axially in the direction of the blocking member. Furthermore, the projection can be guided through the attachment. This means that the outer diameter of the projection is smaller than the inner diameter of the axial hole.

According to an advantageous development of the invention, in the working positions, the armature is in contact with the activation element, the activation element is further in contact with the attachment and, furthermore, the attachment is in contact with the piston.

In particular, the force path is carried out from the armature to the activation element, from the activation element to the attachment and from the attachment to the piston. To this end, the activation element further has a step by means of which an immediate, that is to say, direct contact (without a resilient element being interposed) between the activation element and attachment is possible.

According to an advantageous development of the invention, the proportional valve has a valve bush in which the supply and a discharge are arranged, wherein the piston is arranged in a hole in the valve bush.

In particular, the piston is constructed so as to be able to be axially moved in the valve bush. The high pressure of the supply presses the piston as a portion of the main valve device into a valve seat which is formed by the valve bush. In particular, the piston has a conical shoulder which is pressed onto a shoulder of the valve bush.

According to an advantageous development of the invention, the piston has a peripheral sealing face which with an inner face of the hole of the valve bush blocks the fluid passage of the main valve device. A covering of a predetermined length is formed between the peripheral sealing face of the piston and the inner face. The covering is in this instance the region on which the inner face and sealing face (radially) face each other. In other words, the covering between the peripheral sealing face of the piston and the inner face is a predetermined value. The predetermined value, that is to say, the length, may, for example, be 1 mm.

According to an advantageous development of the invention, the supply is constructed in an axial manner and the discharge is constructed in a radial manner.

Since the supply is constructed in an axial manner, the high pressure of the supply presses axially against the piston and thus ensures a secure closed state of the main valve device. On the other hand, the radial discharge does not inhibit the function and in particular the switching of the proportional valve.

According to an advantageous development of the invention, the blocking member is a sphere.

A sphere can be produced in a particularly simple and cost-effective manner. Furthermore, it performs the blocking function of the pressure compensation valve device in a reliable manner. As a result of the geometrically uniform shape, there is no risk of the sphere tilting and blocking the valve.

According to an advantageous development of the invention, the electromagnetic proportional valve has a first resilient element which pretensions the piston in the direction of the activation element.

In particular, the first resilient element presses the piston as a blocking element into the blocking position thereof.

When the current is switched off and therefore the electromagnet is no longer supplied with electrical power, the piston can therefore be quickly moved again into the blocking position in which the main valve device is closed.

The axially displaceable piston is thus pretensioned in the hole of the valve bush by means of a first resilient element in the direction of the activation element (or the electromagnet or the armature). The first resilient element is preferably constructed as a pressure spring. In a particularly preferred manner, the first resilient element is constructed as a helical spring.

According to an advantageous development of the invention, the first resilient element is arranged between a retention element and the piston, wherein the pretensioning of the first resilient element can be adapted by means of the retention element.

The first resilient element is supported in this instance, on the one hand, on a shoulder of the piston and, on the other hand, on the retention element. The shoulder of the piston is preferably the conical shoulder of the piston which comes into contact with the shoulder of the valve bush.

The retention element is arranged, for example, so as to be screwed into the valve bush in the region of the supply. By screwing in and unscrewing the retention element, the pretensioning force of the first resilient element can therefore be adjusted. The opening behavior of the main valve can consequently be changed in a simple manner. The shoulder therefore performs a dual function so that the complexity of the proportional valve can be reduced.

According to an advantageous development of the invention, the electromagnetic proportional valve has a second resilient element which pretensions the activation element in the direction of the armature.

The second resilient element is in this instance preferably arranged between the activation element and the attachment. This means that the attachment is pressed onto the piston by means of the second resilient element. The second resilient element is preferably constructed as a pressure spring. In a particularly preferred manner, the second resilient element is constructed as a helical spring.

Preferably, the activation element is constructed as an insert. When the activation element is constructed as an insert and is inserted into the armature, the second resilient element may be arranged in such a manner that it is retained by the armature and the activation element.

According to an advantageous development of the invention, the electromagnetic proportional valve has a third resilient element which pretensions the blocking member in the direction of the activation element.

In this instance, the third resilient element is arranged between the piston and blocking member. Therefore, the third resilient element presses the blocking member into its valve seat (this is formed by the shoulder). The third resilient element is preferably constructed as a pressure spring. In a particularly preferred manner, the third resilient element is constructed as a helical spring.

In a particularly preferred manner, the through-hole of the piston has a spring shoulder with which the spring comes into contact. Consequently, one end of the spring comes into contact with the spring shoulder and the other end of the spring comes into contact with the blocking member. The spring is preferably further arranged completely inside the piston.

According to an advantageous development of the invention, the piston has a conical shoulder at the first axial end region.

The conical shoulder comes into contact with the shoulder of the valve bush and acts as a blocking device. It further acts as a stop element for the first resilient element.

According to an advantageous development of the invention, the piston has a combination of a seat and slider function.

The seat function is formed by means of the conical shoulder on the piston and the shoulder of the valve bush. This bush acts as a blocking device. The slider function is performed by means of the peripheral sealing face of the piston and the inner face of the hole of the valve bush which cooperate as a proportional slider.

Furthermore, the solution according to the invention involves providing a system, preferably in a vehicle, having one of the above-described electromagnetic proportional valves, wherein the system is an air-conditioning system, a heat management system or a battery cooling system.

In this instance, all the advantages already mentioned with regard to the proportional valves and individual aspects apply so that they will not be repeated at this point.

Other advantages of the invention will be appreciated from the description and the drawings.

The invention is explained in greater detail below with reference to the description of embodiments with reference to the appended drawings. Other advantageous embodiments and feature combinations of the invention will be appreciated from the following description and all of the patent claims.

In the drawings used to explain the embodiments:

Figure 2:
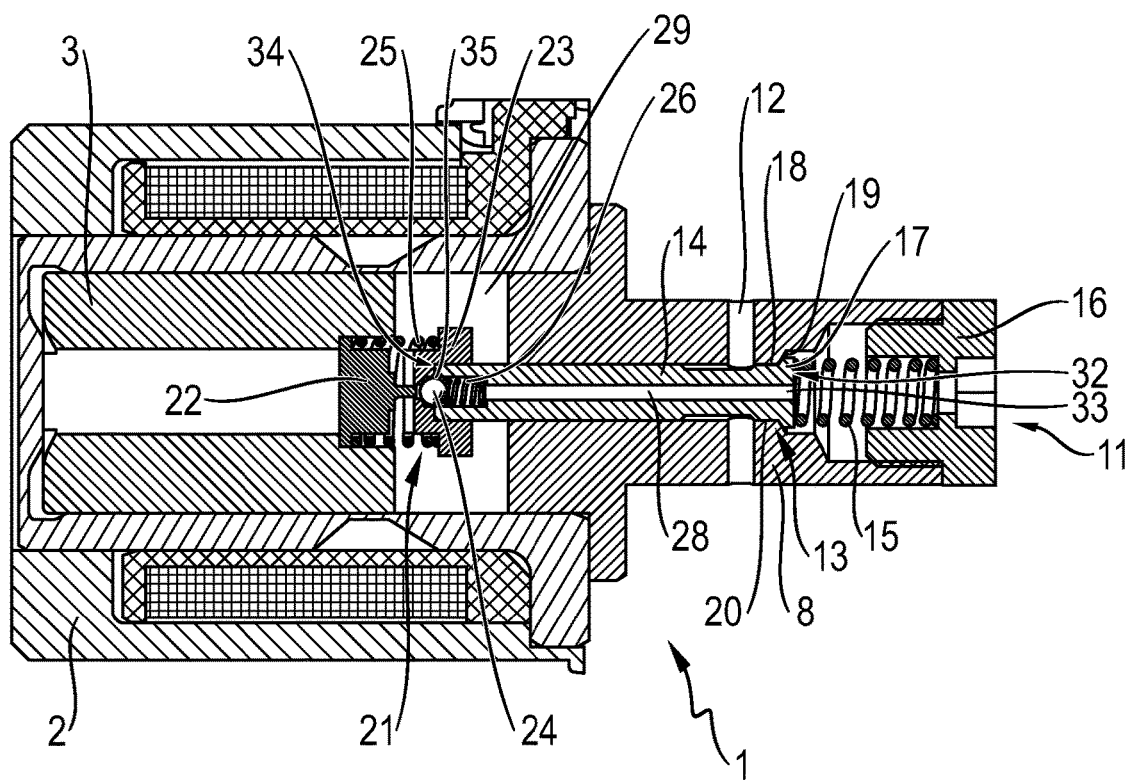
FIG. 2 is a longitudinal section of a proportional valve according to the present invention in a closed state.

FIG. 2 shows a longitudinal section of a proportional valve 1 according to the present invention in a closed state. In this instance, the closed state is the state in which a main valve device 13 is closed in such a manner that no fluid can flow from a supply 11 to a discharge 12. The proportional valve 1 is also referred to as an expansion valve.

The supply 11 and the discharge 12 are arranged in a valve bush 8 of the proportional valve 1. The supply 11 is arranged axially at a longitudinal end of the valve bush 8. The discharge 12 is arranged radially on the valve bush 8.

The proportional valve 1 has an electromagnet 2 and an armature 3. The armature 3 can be axially moved by means of the electromagnet 2. In particular, the armature 2 can be moved in the direction of the supply 11. An activation element 22 is arranged on the armature 3. The activation element 22 is in particular arranged in an axial end region of the armature 3. The activation element 22 moves together with the armature 3. The activation element 22 is also referred to as an insert since it can be inserted into the armature 3.

As illustrated in FIG. 2, an (axial) hole is further arranged in the valve bush 8. A piston 14 is arranged in the hole. The piston 14 can be moved axially in the hole of the valve bush 8. The piston 14 has a first axial end region 32 (on the right in FIG. 2) and a second axial end region 34 (on the left in FIG. 2). The first axial end region 32 is arranged in the direction toward the supply 11. The second axial end region 34 is arranged in the direction toward the activation element 22.

A first opening 33 is arranged in the first axial end region 32 and a second opening 35 is arranged in the second axial end region 34. The openings 33 and 35 are connected to each other by means of a through-hole 28. This means that the piston 14 is constructed as a hollow piston. This also further means that the piston 14 connects a first space which adjoins the first axial end region 32 and a second space which adjoins the second axial end region 34 to each other. Therefore, a fluid (for example, refrigerant) can flow from the first space through the piston 14 to the second space. The first space is the supply 11. The supply 11 is slightly expanded in a manner adjacent to the first axial end region 32. The second space is a pressure compensation space 29. The pressure compensation space 29 is a space between the armature 3 and the valve bush 8 and is also referred to as a magnet space.

An attachment 23 is arranged in the second axial end region 34. The attachment 23 retains a blocking member 24 in the second opening 35. By means of the blocking member 24, the second opening 35 can be closed in such a manner that no fluid can flow through the piston 14. This means that no fluid can flow from the supply 11 to the pressure compensation space 29.

Consequently, the activation element 22, the attachment 23 and the blocking member 24 form a pressure compensation valve device 21. The pressure compensation valve device 21 is also referred to as a second valve device. The blocking member 24 is, as can be seen in FIG. 2, constructed as a sphere. The blocking member 24 is therefore also referred to as a sphere.

The main valve device 13 is also referred to as a first valve device and forms the main seat of the proportional valve 1. The main valve device 13 has two valve functions: valve main seat and proportional slider. The valve main seat is formed by means of a conical shoulder 17 in the first axial end region 32 of the piston 14 and a shoulder 19 of the valve bush 8 and acts as a blocking device. A peripheral sealing face 18 of the piston 14 which adjoins the conical shoulder 17 in an axial direction and which cooperates with an inner face 20 of the hole of the valve bush 8 acts as a proportional slider.

When the main valve device 13 is open, a fluid can flow from the supply 11 to the discharge 12. When the main valve device 13 is closed, however, no fluid can flow from the supply 11 to the discharge 12. The main valve device 13 can be opened only when a pressure compensation has been carried out between the supply 11 and the pressure compensation space 29. The pressure compensation can be carried out only when the pressure compensation valve device 21 is open.

As can further be seen in FIG. 2, there are arranged three resilient elements 15, 25, 26 which support and enable the functions of the proportional valve 1. The resilient elements 15, 25, 26 are constructed as pressure springs and are therefore also referred to as pressure springs.

The first resilient element 15 is constructed to press the piston 14 into the hole of the valve bush 8. In particular, the resilient element 15 is constructed to press the conical shoulder 17 against the shoulder 19 of the valve bush 8. The resilient element 15 thus serves to keep the main valve device 13 in the closed state thereof. As can be seen in FIG. 2, the first resilient element 15 is constructed between the piston 14, in particular the conical shoulder 17 thereof, and a retention element 16. This means that the first resilient element 15 is supported, on the one hand, on the conical shoulder 17 of the piston 14 and, on the other hand, on the retention element 16.

As can further be seen in FIG. 2, the retention element 16 is constructed in a state screwed into the valve bush 8 in a region of the supply 11. As can also be seen in FIG. 2, the supply 11 of the fluid is carried out through a recess of the retention element 16 (and the first resilient element 15).

By means of the retention element 16, the resilient force by means of which the piston 14 is pretensioned can be adjusted. This is possible in a particularly simple manner when the retention element 16 can be screwed into the valve bush 8.

The second resilient element 25 is arranged between the activation element 22 and the attachment 23. The second resilient element 25 is used to pretension the attachment 23 in the direction of the piston 14. Furthermore, the second resilient element 25 serves to pretension the activation element 22 in a direction away from the blocking member 24.

The second resilient element 25 thus retains the activation element 22 in a position in which the blocking member 24 is not activated. When the activation element 22, as can be seen in FIG. 2, is constructed as an insert, the second resilient element 25 is retained by the armature 3 and the activation element 22. In particular, the second resilient element 25 is guided in regions between an outer periphery of the activation element 22 and an inner periphery of the armature 3.

The third resilient element 26 is arranged between the blocking member 24 and a spring shoulder 36 (see FIG. 3 or 4) in the through-opening 28 in the piston 14. The third resilient element 26 serves to pretension the blocking member 24 against a valve seat or sealing seat on the attachment 23. This means that the third resilient element 26 keeps the pressure compensation valve device 21 closed. The pressure compensation valve device 21 is also kept closed by the high pressure which acts on the blocking member 24 in addition to the pretensioning force of the third resilient element 26 through the through-hole 28 of the piston 14.

Particularly in the state of the proportional valve 1 illustrated in FIG. 2, high pressure is applied in the supply 11 and low pressure is applied in the pressure compensation space 29.

The state of the proportional valve 1 illustrated in FIG. 2 is the (completely) closed state of the expansion valve 1.

In the state of the proportional valve 1 illustrated in FIG. 2, the pressure compensation valve device 21 and the main valve device 13 are closed. In particular, all the resilient elements 15, 25 and 26 are loaded with pretensioning.

Figure 3:
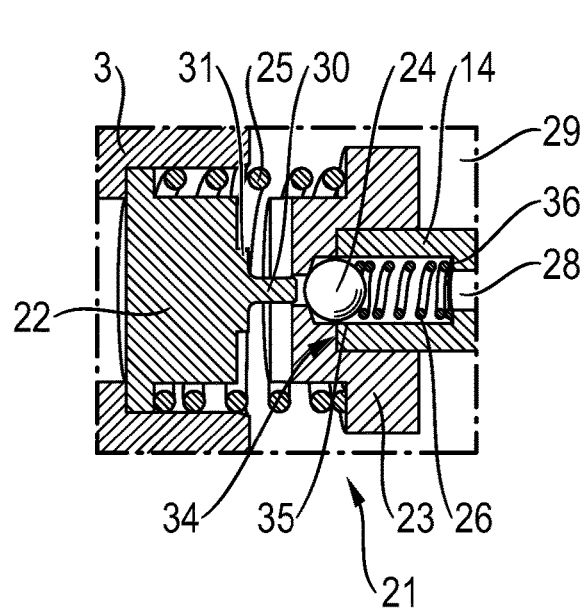
FIG. 3 is an enlarged longitudinal section of a pressure compensation valve device of the proportional valve according to the present invention in a closed state.

The closed pressure compensation valve device 21 is shown in greater detail in FIG. 3. Here, the blocking member 24 is pressed against the sealing seat in the attachment 23. Between the blocking member 24 and the activation element 22, a spacing is formed. This means that the activation element 22 is not in contact with the blocking member 24. Since the blocking member 24 closes the second opening 35, no fluid can flow between the high-pressure region of the supply 11 and the low-pressure region of the pressure compensation space 29.

Figure 7:
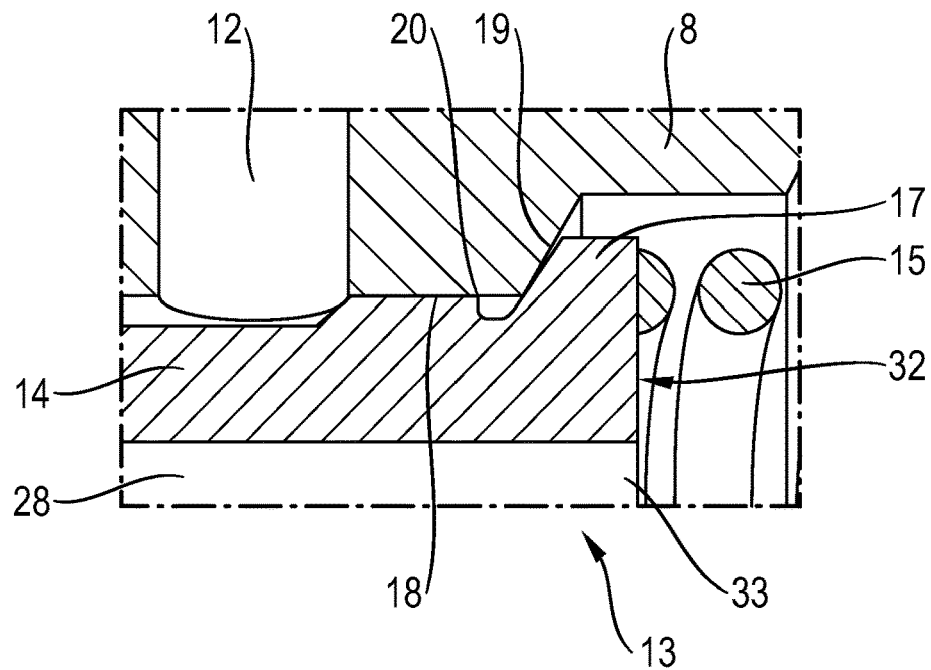
FIG. 7 is an enlarged longitudinal section of a main valve device of the proportional valve according to the present invention in a closed state.

The closed main valve device 13 is shown in greater detail in FIG. 7. The conical shoulder 17 on the piston 14 and the shoulder 19 of the valve bush 8 block the main valve device 13. The piston 14 is pressed by the first resilient element 15 against the shoulder 19. Furthermore, the peripheral sealing face 18 of the piston 14 is in contact with the inner face 20 of the hole of the valve bush 8. No fluid can flow between the supply 11 and the discharge 12. In particular, no fluid can flow past between the piston 14 and the valve bush 8 since no sufficient intermediate space is constructed between the two components.

The armature 3 is located as illustrated in FIG. 2 in an idle position. The idle position is in FIG. 2 the position on the left. In more general terms, the armature 3 is arranged in the idle position in a position which is furthest away from the valve bush 8 (or also the retention element 16 or also the supply 11).

Figure 5:
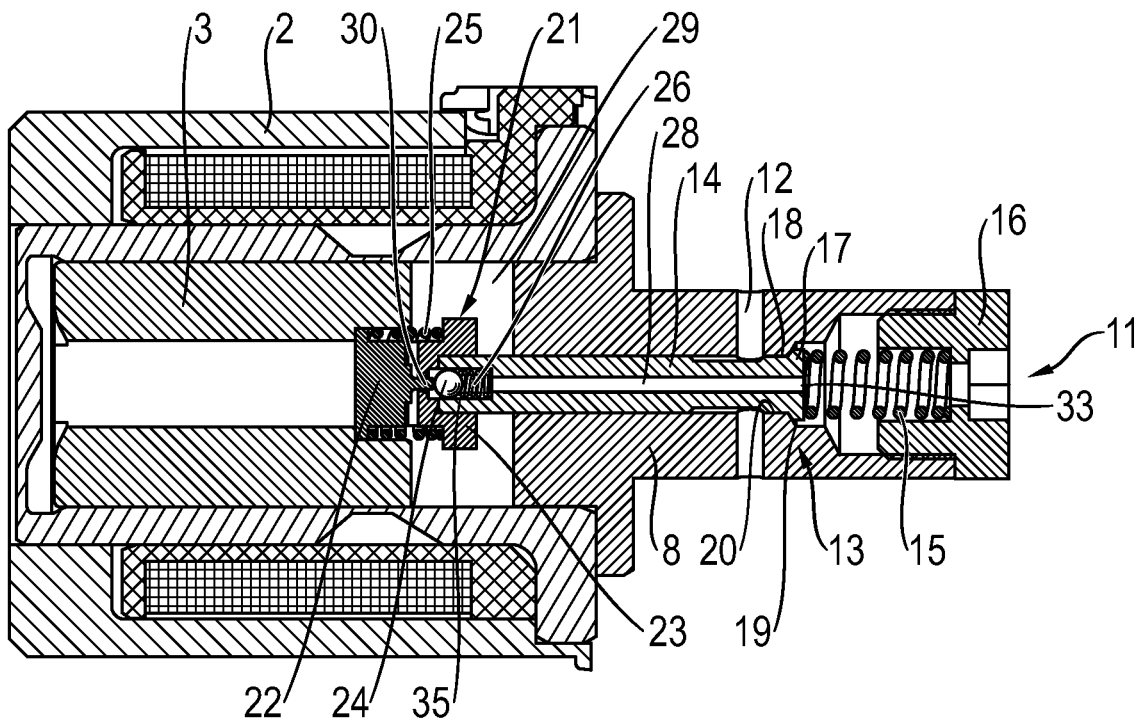
FIG. 5 is a longitudinal section of the proportional valve according to the present invention in an activation position.

FIG. 5 shows the proportional valve 1 in an activation position.

In the state of the proportional valve 1 shown in FIG. 5, the pressure compensation valve device 21 is open and the main valve device 13 is closed. In particular, the third resilient element 26 is further compressed to the maximum extent, the second resilient element 25 is slightly compressed and the first resilient element 15 is loaded with pretensioning.

The armature 3 is located as illustrated in FIG. 5 in an activation position. The activation position is a position further right than the idle position. This means that the armature 3 has been moved from the idle position axially to the right into the activation position. In particular, the armature 3 has been moved axially in the direction of the piston (or also the valve bush 8, the retention element 16 or the supply 11). The activation element 22 moves together with the armature 3. As a result of the movement of the armature 3 into the activation position, the activation element 22 is also moved into the activation position.

Figure 4:
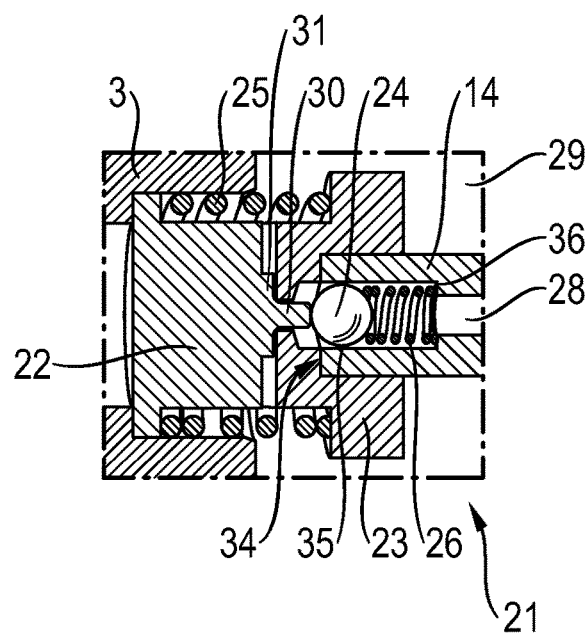
FIG. 4 is an enlarged longitudinal section of a pressure compensation valve device of the proportional valve according to the present invention in an open state.

As can be seen in particular in FIG. 4, the activation element 22 in the activation position comes into contact with the blocking member 24. In particular, an axial projection 30 of the activation element 22 comes into contact with the blocking member 24 in such a manner that the blocking member 24 is pressed in the direction of the pretensioning second resilient element 26. This means that the blocking member 24 is moved axially in the direction of the supply 11.

In particular, the blocking member 24 is moved out of the sealing seat of the attachment 23. In this instance, the first opening 33, which was previously closed, is released in such a manner that a fluid can flow between the high-pressure region of the supply 11 and the low-pressure region of the pressure compensation space 29. More specifically, fluid can then flow around the blocking member 24. A pressure compensation between the supply 11 and the pressure compensation space 29 can therefore be carried out.

In other words, the armature 3 moves after being supplied with electrical power in the direction of the valve bush 8. The activation element 22 moves with the armature 3, wherein the second resilient element 25 is compressed. With the projection 30 which is introduced into the attachment 23, the activation element 22 opens the pressure compensation valve device 21 since the blocking member 22 is raised from the sealing seat thereof counter to the resilient force of the third resilient element 26. The fluid (refrigerant) which is under high pressure can thereby flow in the direction of the pressure compensation space 29 through the through-hole 28 of the piston 14 and there is a pressure compensation. The pressure loading on the main valve device 13 is thereby reduced.

The main valve device 13 is still closed and therefore corresponds to the state shown in FIG. 7. The conical shoulder 17 on the piston 14 is still pressed by the first resilient element 15 against the shoulder 19. The two elements block the proportional valve 1. The peripheral sealing face 18 of the piston 14 is in contact with the inner face 20 of the hole of the valve bush 8.

Figure 6:
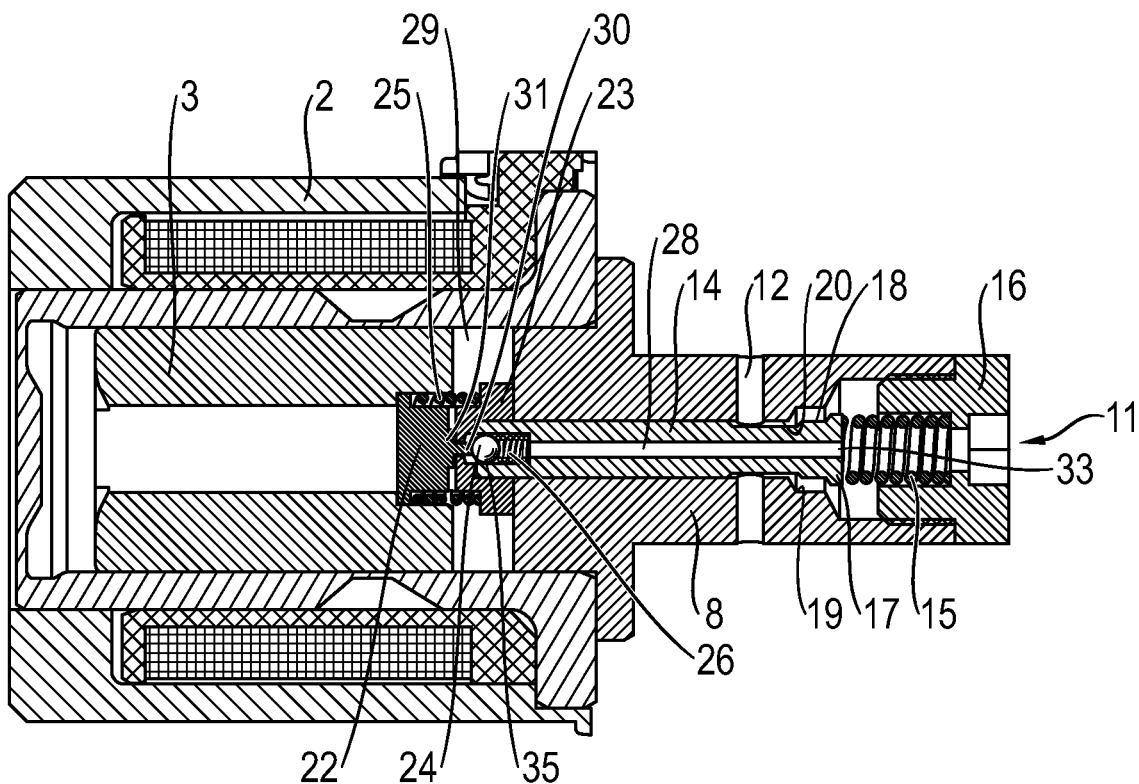
FIG. 6 is a longitudinal section of the proportional valve according to the present invention in a (completely) open state.

FIG. 6 shows the proportional valve 1 in a working position.

In the state of the proportional valve 1 shown in FIG. 6, both the pressure compensation valve device 21 and the main valve device 13 are open. In particular, the third resilient element 26 is further still compressed to the maximum extent, the second resilient element 25 is still slightly compressed and the first resilient element 15 is also compressed to the maximum extent. Therefore, the maximum opening state of the main valve device 13 is shown in FIG. 6.

The armature 3 is located as illustrated in FIG. 6 in a working position. There are a large number of working positions. The working positions are generally arranged further to the right than the activation position. This means that the armature 3 has been moved from the activation position to the right (in the direction of the supply 11) into the working position. Since it is a proportional valve 1, not only is a working position formed, but also a continuous transition from different working positions is possible. It can thus not only be switched in a discrete manner but also in several working positions with a different volume flow of the fluid.

In particular, the armature 3 has been moved axially further in the direction of the valve bush 8 (or also of the retention element 16 or supply 11). As can be seen in particular in FIG. 4, the activation element 22 is in the working position or the working positions directly in contact with the attachment 23. In particular, a step 31 of the activation element 22 comes into contact with the attachment 23 in such a manner that the attachment 23 can be moved axially with the activation element 22 (and the armature 3). Since the attachment 23 is in direct contact with the piston 14, it can also be moved directly. This means that, in the event of a movement of the armature 3, the piston 14 also moves accordingly.

Figure 8:
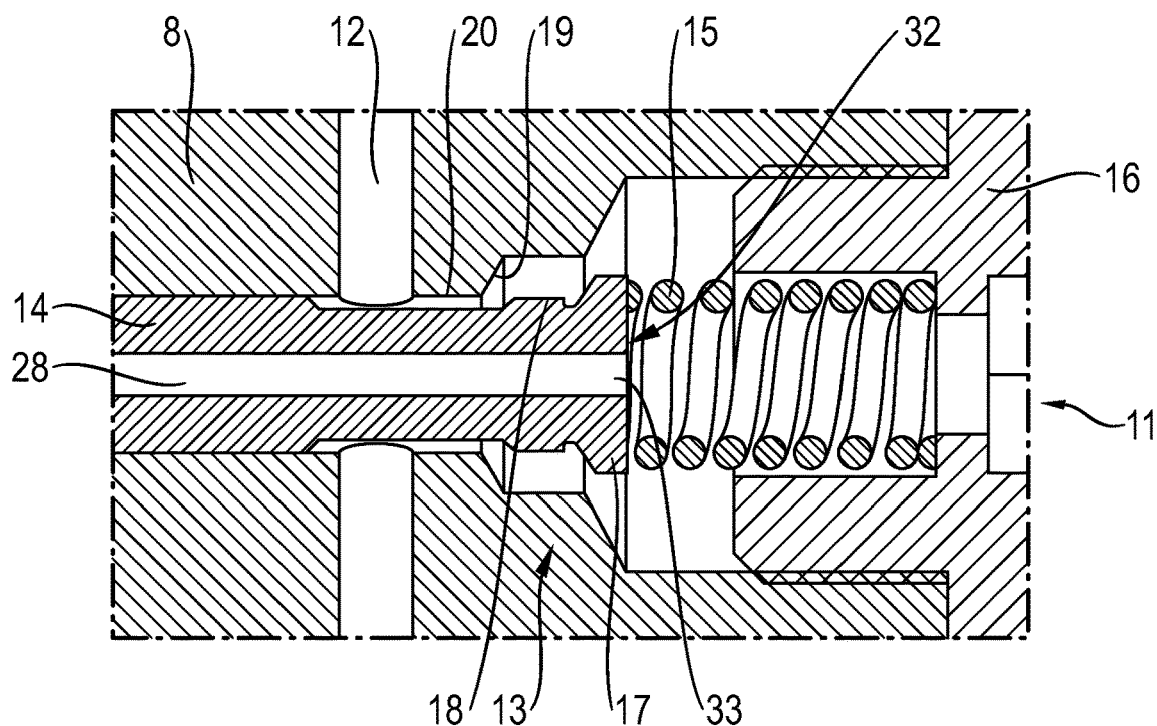
FIG. 8 is an enlarged longitudinal section of a main valve device of the proportional valve according to the present invention in a (completely) open state.

In other words, the working positions represent a further displacement of the armature 3 in the direction of the valve bush 8. In this instance, the first resilient element 15 is compressed so that the conical shoulder 17 of the piston 14 can be raised from the shoulder 19 of the valve bush 8. The seat function of the main valve device 13 is converted in this instance into a slider function. If the armature 3 is displaced further, the main valve device 13 opens completely. This state of the completely opened main valve device 13 is illustrated in FIG. 8. The piston 14 is displaced at that location axially in the direction of the supply 11 to such an extent that there is no longer any overlap between the peripheral sealing face 18 of the piston 14 and the inner face 20 of the hole of the valve bush 8. Consequently, the fluid can flow from the supply 11 to the discharge 12.

According to another embodiment, the invention relates to an expansion valve for refrigerant and an air-conditioning system, a heat management system or a battery cooling system with an expansion valve.

Expansion valves are used in a battery cooling, air-conditioning or thermal pumping system in order to produce a defined and controllable pressure drop between the condenser (heat discharge) and evaporator (cooling). The pressure drop produced by the expansion valve produces a linked temperature change in the refrigerant. The valve is part of a controller which controls the overheating of the refrigerant before entry into the compressor.

An object of the invention is to provide an expansion valve which is optimized in terms of function. At the same time, an expansion valve which can be produced in a simple and cost-effective manner is intended to be provided.

Other objectives of the invention are to provide an air-conditioning unit, a heat management system and a battery cooling system having an expansion valve.

Other advantages of the invention will be appreciated from the patent claims, the description and the drawings.

Figure 1:
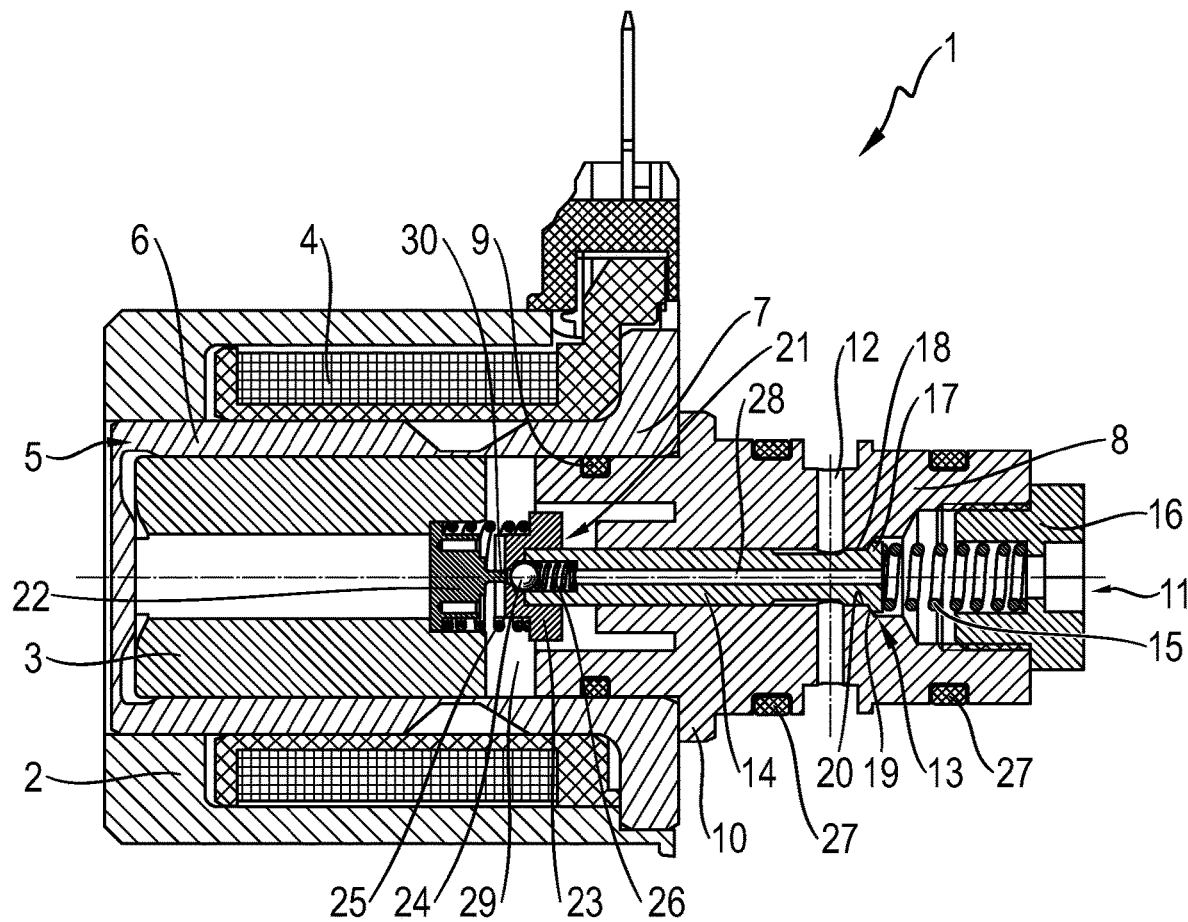
FIG. 1 is a detailed longitudinal section of a proportional valve according to the present invention.

The invention is explained in greater detail below with reference to the embodiment which is illustrated in the drawings. FIG. 1 shows an expansion valve 1 for refrigerant according to an embodiment as a longitudinal section.

The expansion valve 1 has an electromagnet 2 having a coil 4 and an armature 3 which is arranged so as to be able to be axially displaced in a pole cap 5. The pole cap 5 is provided in one piece in the embodiment shown and has a pole pipe 6 and a pole core 7, wherein a thin connection web is provided between the pole pipe 6 and the pole core 7.

An end portion of a valve bush 8 is sealed by means of a sealing element 9 and provided in a state pressed into the pole core 7. A peripheral collar 10 of the valve bush 8 abuts with the end face against the pole core 7 so that the valve bush 8 is positioned with respect to the electromagnet 2. A piston 14 is arranged so as to be able to be axially displaced in the valve bush 8 which has an axially constructed supply 11 and at least one radial discharge 12. The supply 11 forms a high-pressure connection P, the radial discharge(s) form(s) a low-pressure connection LP. The expansion valve has in the connection between the supply 11 and the discharge 12 a first valve device 13 which has a combination of a valve main seat and a proportional slider. The first valve device 13 is constructed to be able to be opened or closed by means of the electromagnet 2. The piston 14 is arranged so as to be able to be axially displaced in a hole of the valve bush 8 and resiliently pretensioned by means of a first pressure spring 15 in the direction of the electromagnet 2. The pressure spring 15 is supported, on the one hand, on a shoulder of the piston 14 and, on the other hand, on a retention element 16 which is provided, for example, in the region of the supply 11 in a state screwed into the valve bush 8. As can be seen in FIG. 1, the supply 11 of the refrigerant is carried out through a recess of the retention element 16 and the first pressure spring 15. By means of the retention element 16, the resilient force with which the piston 14 is pretensioned can be adjusted.

The first valve device 13 forms the main seat of the expansion valve 1 and has two valve functions: valve main seat and proportional slider. The valve main seat is formed by means of a conical shoulder 17 on the piston 14 and a shoulder 19 of the valve bush 8 and acts as a blocking device. A peripheral sealing face 18 of the piston 14 which adjoins the shoulder 17 in an axial direction and which cooperates with an inner face 20 of the hole of the valve bush 8 acts as a proportional slider.

As can be seen in FIG. 1, the conical shoulder 17 of the piston 14 is arranged opposite the shoulder on which the pressure spring 15 is supported.

A second valve device 21 for pressure compensation of the first valve device 13 is provided. This device comprises an insert 22 which is arranged in a state secured in the armature 3, an attachment 23 which is secured to an end of the piston 14 and a sphere 24 as a closure element. Between the insert 22 and the shoulder 23, there is provided a second pressure spring 25 which pretensions the attachment 23 in the direction of the piston 14. The sphere 24 is further placed by means of a third pressure spring 26 against the sealing seat thereof on the attachment 23.

Sealing elements 27 on the outer periphery of the valve bush 8 enable a sealing with respect to a housing, etcetera, which is not illustrated and in which the expansion valve 1 is arranged.

In the basic position of the expansion valve 1 shown, both valve devices 13 and 21 are closed. As a result of the high pressure applied at the supply 11 and the pressure spring 15, the valve device 13 is kept closed. The second valve device 21 is also kept closed by the high pressure which acts on the sphere 24 in addition to the pretensioning force of the pressure spring 26 through a through-hole 28 of the piston 14. In a magnet space 29 between the armature 3 and the valve bush 8, low pressure is applied.

If the electromagnet 2 is supplied with electrical power, the armature 3 moves in the direction of the valve bush 8. The insert 22 moves with the armature 3, wherein the second pressure spring 25 is compressed. The insert 22 opens the second valve device 21 with a projection 30 which is introduced into the attachment 23 since the sphere 24 can open counter to the resilient force of the third pressure spring 26 and is lifted from the sealing seat thereof. Refrigerant which is under high pressure can thereby flow through the through-hole 28 of the piston 14 in the direction toward the magnet space 29 and a pressure compensation is carried out, whereby the pressure loading on the first valve device 13 can be reduced.

With a further displacement of the armature 3 in the direction toward the valve bush 8, the first pressure spring 15 is compressed so that the conical shoulder 17 of the piston 14 can be lifted from the shoulder 19 of the valve bush 8. The seat function of the first valve unit 13 is converted into a slider function. The overlap between the peripheral sealing face 18 of the piston 14 and the inner face 20 is a predetermined value.

If the armature 3 is moved further, the first valve device 13 opens completely since there is no longer any overlap between the peripheral sealing face 18 of the piston 14 and the inner face 20.

For example, the invention relates to an expansion valve for refrigerant having an electromagnet having a coil and an armature which is arranged so as to be able to be axially displaced, a piston which is arranged so as to be able to be axially displaced in a valve bush, wherein the valve bush has a supply and at least one discharge and in the connection between the supply and discharge there is provided a first valve device which has a combination of a blocking function and proportional slider and is constructed so as to be able to be opened or closed by means of the electromagnet, and a second valve device for pressure compensation of the first valve device.

According to another embodiment, the first valve device has a combination of a seat and slider function.

According to an additional embodiment, the second valve device is constructed as a seat valve, for example, as a spherical seat valve.

According to a specific embodiment, the invention relates to an air-conditioning unit, in particular an air-conditioning unit for a vehicle, having an expansion valve according to the preceding embodiments.

According to an alternative embodiment, the invention relates to a heat management system, in particular a heat management system for a vehicle, having an expansion valve according to the preceding embodiments.

According to yet another embodiment, the invention relates to a battery cooling system, in particular a battery cooling system for a vehicle, having an expansion valve according to the preceding embodiments.

The invention claimed is:

1. An electromagnetic proportional valve comprising:
a main valve device;
an armature of an electromagnet which is arranged so as to be able to be moved axially between an idle position, an activation position and working positions and on which an activation element is arranged;
a piston which is constructed as a hollow piston and which has at a first axial end region a first opening toward a supply of the proportional valve and at a second axial end region a second opening toward a pressure compensation space, wherein an attachment is arranged at the second axial end region; and
a blocking member in the form of a spring-pretensioned sphere, which is retained in the second opening by the attachment and constructed to close the second opening, wherein the blocking member is independent of the activation element,
wherein the piston is arranged so as to be able to be axially displaced and wherein the piston is constructed to block a fluid passage between the supply and a discharge as a blocking element of the main valve device,
wherein the fluid passage of the main valve device is blocked in the idle position of the armature,
wherein the activation element is constructed to act in the activation position of the armature on the blocking member in such a manner that the blocking member releases the second opening at least in regions, wherein the main valve device is closed, and
wherein the fluid passage of the main valve device is open in the working positions of the armature.

2. The electromagnetic proportional valve according to claim 1, wherein the movement of the armature in the working positions is transmitted directly to the piston.

3. The electromagnetic proportional valve according to claim 1, wherein, in the working positions, the armature is in contact with the activation element, the activation element is in contact with the attachment and the attachment is in contact with the piston.

4. The electromagnetic proportional valve according to claim 1, wherein the proportional valve has a valve bush in which the supply and the discharge are arranged, and wherein the piston is arranged in a hole in the valve bush.

5. The electromagnetic proportional valve according to claim 4, wherein the piston has a peripheral sealing face which with an inner face of the hole blocks the fluid passage of the main valve device.

6. The electromagnetic proportional valve according to claim 4, wherein the supply is constructed in an axial manner and the discharge is constructed in a radial manner.

7. The electromagnetic proportional valve according to claim 1, wherein the electromagnetic proportional valve has a first resilient element which pretensions the piston in the direction of the activation element.

8. The electromagnetic proportional valve according to claim 7, wherein the first resilient element is arranged between a retention element and the piston, and wherein the pretensioning of the first resilient element is configured to be adapted by the retention element.

9. The electromagnetic proportional valve according to claim 1, wherein the electromagnetic proportional valve has a second resilient element which pretensions the activation element in the direction of the armature.

10. An electromagnetic proportional valve comprising,
an armature of an electromagnet which is arranged so as to be able to be moved axially between an idle position, an activation position and working positions and on which an activation element is arranged;
a piston which is constructed as a hollow piston and which has at a first axial end region a first opening toward a supply of the proportional valve and at a second axial end region a second opening toward a pressure compensation space; and
a blocking member, which is constructed to close the second opening,
wherein the piston is arranged so as to be able to be axially displaced and wherein the piston is constructed to block a fluid passage as a blocking element of a main valve device,
wherein the fluid passage of the main valve device is blocked in the idle position of the armature,
wherein the activation element is constructed to act in the activation position of the armature on the blocking member in such a manner that-it the blocking member releases the second opening at least in regions, and
wherein the fluid passage of the main valve device is open in the working positions of the armature, and
wherein the electromagnetic proportional valve has a first resilient element which pretensions the piston in a direction of the activation element, a second resilient element which pretensions the activation element in a direction of the armature, and a third resilient element which pretensions the blocking member in the direction of the activation element.

11. The electromagnetic proportional valve according to claim 1, wherein the piston has a conical shoulder at the first axial end region.

12. The electromagnetic proportional valve according to claim 1, wherein the piston has a combination of seat and slider function.

13. A system in a vehicle, comprising an electromagnetic proportional valve according to claim 1, wherein the system is an air-conditioning system, a heat management system or a battery cooling system.

14. The electromagnetic proportional valve according to claim 2, wherein the proportional valve has a valve bush in which the supply and the discharge are arranged, and wherein the piston is arranged in a hole in the valve bush.

15. The electromagnetic proportional valve according to claim 3, wherein the proportional valve has a valve bush in which the supply and the discharge are arranged, and wherein the piston is arranged in a hole in the valve bush.

16. The electromagnetic proportional valve according to claim 5, wherein the supply is constructed in an axial manner and the discharge is constructed in a radial manner.

* * * * *